US007180869B2

(12) United States Patent
Spencer

(10) Patent No.: US 7,180,869 B2
(45) Date of Patent: Feb. 20, 2007

(54) COMPREHENSIVE ECHO CONTROL SYSTEM

(75) Inventor: Douglas A. Spencer, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 904 days.

(21) Appl. No.: 09/943,283

(22) Filed: Aug. 30, 2001

(65) Prior Publication Data
US 2003/0043783 A1 Mar. 6, 2003

(51) Int. Cl.
G08C 15/00 (2006.01)
H04M 9/08 (2006.01)

(52) U.S. Cl. .................................. 370/252; 379/406.01

(58) Field of Classification Search ............ 379/406.01, 379/406.04, 406.08; 370/252
See application file for complete search history.

(56) References Cited

U.S. PATENT DOCUMENTS

| | | | |
|---|---|---|---|
| 5,530,724 A | 6/1996 | Abrams et al. | |
| 5,909,384 A | 6/1999 | Tal et al. | |
| 5,999,901 A | 12/1999 | Knittle et al. | |
| 6,067,299 A | 5/2000 | DuRee | |
| 6,151,315 A * | 11/2000 | Ash et al. | 370/352 |
| 6,208,637 B1 | 3/2001 | Eames | |
| 6,256,384 B1 | 7/2001 | Trump | |
| 6,738,358 B2 * | 5/2004 | Bist et al. | 370/289 |

OTHER PUBLICATIONS

Mirriam-Webster's Collegiate Dictionary, 10th ed., 1993, p. 894, left column.*
Newton, Harry; Newton's Telecom Dictionary, Mar. 2004, 20th ed., CMP Books, p. 816, left column.*

* cited by examiner

Primary Examiner—Chau Nguyen
Assistant Examiner—Kerri M. Rose
(74) Attorney, Agent, or Firm—John C. Moran

(57) ABSTRACT

Providing a systematic and comprehensive mechanism for applying echo cancellation within a telecommunication switching system by a local switching system such as a PBX. Echo cancellation circuits are deployed throughout the telecommunication switching system using different types of echo cancellation circuits with each type having different capabilities with respect to a time offset of an echo return signal relative to when an voice signal was generated by a talker. The echo cancellation circuits deployed within the local telecommunication switch are an integral part of trunk circuits and provide the largest time offset. Further, the echo cancellation circuits deployed within in the local telecommunication switch are capable of controlling echoes in either direction with respect to the integral trunk circuit and may be used as service circuits if not needed by the integral trunk circuit. A systematic and comprehensive mechanism further comprises terminating echoes at the edges of networks having long transmission delays such as a wide area network (WAN) comprising a combination of ATM and/or IP switching networks. The mechanism enables uniformity in policing echoes at the "near end" at the appropriate points in the PBX network or in a network of PBX's.

48 Claims, 10 Drawing Sheets

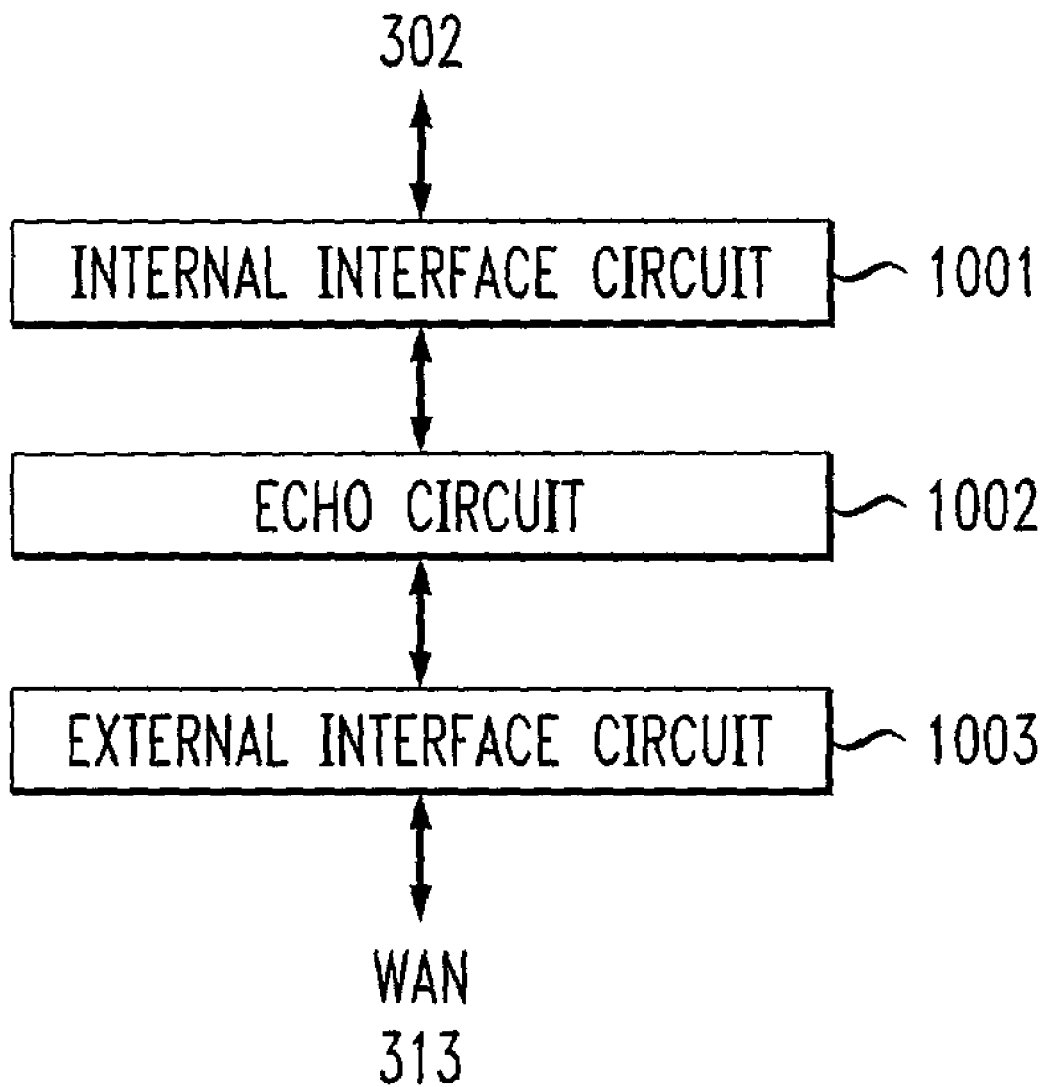

COMPREHENSIVE ECHO CONTROL SYSTEM

TECHNICAL FIELD

The present invention relates to telecommunications switching systems and, in particular, to providing echo control across local exchange carrier systems, interexchange carrier systems, and business communication switching systems.

BACKGROUND OF THE INVENTION

Within the prior art, echoes within telephone switching systems are well known. Such echoes are normally caused by hybrid unbalanced conditions at a four-wire to two-wire conversion points in a local exchange carrier network or a telephone set or both. In addition, within a telephone set, acoustical feedback can cause echoes as well. There are two basic factors that determine whether echoes are perceived by humans or not. These two factors are highly interrelated. The first factor is the signal level of the echo return signal (also referred to as acoustic to acoustic echo path loss) which is defined as the level of the returned echo signal relative to the transmitted voice signal. The second factor is the time offset of the echo return signal relative to when the voice signal was generated by the talker. FIG. 1 illustrates in graphic form the manner in which loss (manifested in the relative strength of an originating signal and the strength of the returned echo signal) can be utilized to migrate the affects of echo. The lines such as lines 101 and 102 illustrate the echo path delay in milliseconds plotted against the acoustic-to-acoustic echo path loss in dB along the horizontal scale. Plotted on the vertical scale is the rating given by an average group of listeners with the percentage indicating the members of the group who believe that the resulting speech was good or better. The definition and use of the average group is defined in the book entitled Transmission Systems for Communications, Bell Telephone Laboratories, 5$^{th}$ Edition, 1982. Examining line 102, it can be seen that an average group of listeners finds an echo of 5 milliseconds very acceptable if the difference in the echo path loss is in excess of 30 dB. Conversely, if the echo path delay is 5 milliseconds and there is no loss, line 102 shows that only 30 percent of an average group would find this an acceptable telephone conversation. Even for a large echo delay of 1200 milliseconds as illustrated in line 103, if the echo path loss is 60 dB, 90 percent of an average group find that this amount of delay is acceptable. Contrast this against 1.5 milliseconds of echo path delay as illustrated by line 101 with no echo path loss. In this situation, only 70 percent of an average group would find acceptable a delay of 1.5 milliseconds with no echo path loss.

The human perception of echoes verses echo path loss has been well understood within the telephone industry for many years. The designers of prior art telephone switching systems have utilized the manipulation of path loss (referred to as the loss plan technique) to mitigate negative human perception of echoes. The loss plan technique was particularly effective when the national telephone system was controlled by the Bell System. The Bell System was able to implement the loss plan technique effectively. This technique was also aided by the fact that the majority of the prior art telephone switching equipment was circuit-switched equipment or time division multiplex, both of these types of switching systems have low delay times (on the order of a few milliseconds), because of this, the loss plan technique was capable of controlling the perception of echoes.

However, even in prior art switching systems, it has been necessary from time to time to utilize external echo cancellation circuits for severe cases. Indeed, the perceptual effects of echoes due to time offset as well as a high echo return signal are known. When echo returns are high, but delay is low, the perceptual effect is a side tone effect similar to the high side tones experienced in some European countries. On the other hand, the barrel perceptual effect which is encountered when two telephone sets are offhook at the same time occurs from relatively low time offsets in the range of 30–40 msec. When delays in the echo path are long, the perceptual effect is similar to the effect of bouncing ones voice off a mountain.

Echo cancellers (also referred to as echo cancellation circuits) for switching networks are normally finite impulse response digital filters that are implemented using DSP or ASIC circuits. These filters have the advantage that the device resources needed are roughly linearly proportioned to the echo cancellation tail length. An echo cancellation tail length is the time period relative to the reference between the end of the speech burst at the transmitting end and receipt of the end of the echo return at the transmitting end. The cost of an echo canceller is determined to a large extent by the length of the echo cancellation tail for which the echo canceller can compensate. Because the cost of echo cancellers increases as the echo tail length capability increases, it is highly desirable not to utilize echo cancellers that have an echo cancellation tail length greater than what is needed. Another type of echo canceller is an infinite impulse response filter which requires fewer resources than the finite impulse response digital filter but has stability problems.

The prior art telephone switching systems have approached the echo problem in two basic ways. The first is that adopted by the interexchange carriers which is to put an echo canceller on every link going to the local exchange carriers. The second method that has been adopted by most PBX (also referred to as business communications systems or enterprise switching systems) manufacturers has been to add echo cancellers to links to a local exchange carrier only when the need has arisen in the field. The technique utilized by the interexchange carriers is economic for these carriers since their connection to the local exchange carriers is only via high capacity digital trunks. Interexchange carriers deploy echo cancellers at the point of termination between their networks and local exchange carrier networks to avoid having problems with echoes generated in the local exchange networks being perceived by users as an interexchange carrier problem. For a variety of reasons that are described in the following paragraphs, PBX manufacturers are not free because of economic constraints to adopt the method used by the interexchange carrier nor will their prior art technique of adding echo cancellers on a need based scheme work either. A PBX is in many cases placed in the network between a local exchange carrier and an interexchange carrier. A PBX experiences the same echo environment as that seen by an interexchange carrier, and could be indicted by users as causing echo problems which actually occur in local exchange carrier networks. If not dealt with by the PBX, then, these problems are perceived by customers as being problems within the PBX.

PBX and other types of intermediate switch manufacturers face a number of problems with respect to echoes due to the changing environment in which PBXs are being used. The prior art PBX normally connected to telephones that were part of the PBX system (referred to as intercom telephones), local exchange carriers and occasionally to interexchange carriers. However, the prior art PBXs rarely were utilized to communicate a number of calls from a telephone connected to the local exchange carrier to an interexchange carrier. In this case, the PBX resides between the local exchange carrier and the interexchange carrier, and the echo problems of the local exchange carrier are assumed by the customers to be caused by the PBX. Where in reality, the problem is in the local exchange carrier with the delay through the interexchange carrier simply making these echoes perceptually more pronounced. One such situation is where the PBX is used as a call center system and has a number of remote call center agents connected through a local exchange carrier to the PBX. The PBX is receiving "800" type calls from the interexchange carrier and then is re-routing these calls via the local exchange carrier to the remote call center agents. The problem becomes particularly severe where the PBX is interconnected to the local exchange carrier via analog trunks.

FIG. 2 illustrates a prior art situation where PBX 201 and PBX 203 utilize a connection via local exchange carrier 202 to form a PBX network. The problem occurs in an example where telephone 218 of local exchange carrier 206 is engaged in a telephone call with telephone 212 local exchange carrier 204 via PBX 203, local exchange carrier 202 and PBX 201. If local exchange carrier 204 has an excessive amount of echo path delay this echo path delay is accentuated for a user of telephone 218 and may be attributed by the user of telephone 218 as a defect in PBX 203. In addition, local exchange carrier 206 may also have excessive echo path delay, and the problem is compounded for both telephones 212 and 218 with the user of each telephone assuming that their respective PBX is malfunctioning.

Another situation where PBXs are exposed to the echoes originating in local exchange carriers causing problems is where the PBX utilizes an ATM network or an IP connection to complete a call from the PBX to a distant station. An IP connection in particular introduces a large delay into the transmission path due to switching and encoding times.

SUMMARY OF THE INVENTION

The aforementioned problems are solved and a technical advance is achieved in the art by an apparatus and method that provide a systematic and comprehensive mechanism for applying echo cancellation within a telecommunication switching system by a local switching system such as a PBX. Echo cancellation circuits are deployed throughout the telecommunication switching system using different types of echo cancellation circuits with each type having capabilities with respect to a time offset of an echo return signal (echo tail length) relative to when a voice signal was generated by a talker. Advantageously, the echo cancellation circuits deployed within the local telecommunication switch having the largest echo tail lengths are an integral part of digital trunk circuits. Further, the echo cancellation circuits deployed within in the local telecommunication switch are capable of controlling echoes in either direction with respect to the integral trunk circuit and may be used as service circuits if not needed by the integral trunk circuit.

Advantageously, the systematic and comprehensive mechanism further comprises terminating echoes at the edges of networks having long transmission delays such as a wide area network (WAN) comprising a combination of ATM and/or IP switching networks. For example, a remote network controller or soft phone eliminates echoes before transmitting voice information into the WAN. Similarly, a PBX eliminates echoes in voice information received from local exchange carriers before transmitting the voice information into the WAN via the PBX. Advantageously, the termination of echoes at the edges of networks having long transmission delays allows for the use of echo cancellation circuits having shorter echo tail lengths than if echo cancellation circuits were used to terminate the echoes after transmission through the networks having long transmission delays. The method of the present invention enables uniformity in policing echoes at the "near end" at the appropriate points in the PBX network or in a network of PBX's.

Other and further aspects of the present invention will become apparent during the course of the following description and by reference to the accompanying drawing.

BRIEF DESCRIPTION OF THE DRAWING

FIG. 10 illustrates, in block diagram form, an IP Trunk for implementing an embodiment of the invention

DETAILED DESCRIPTION

Figure 3:
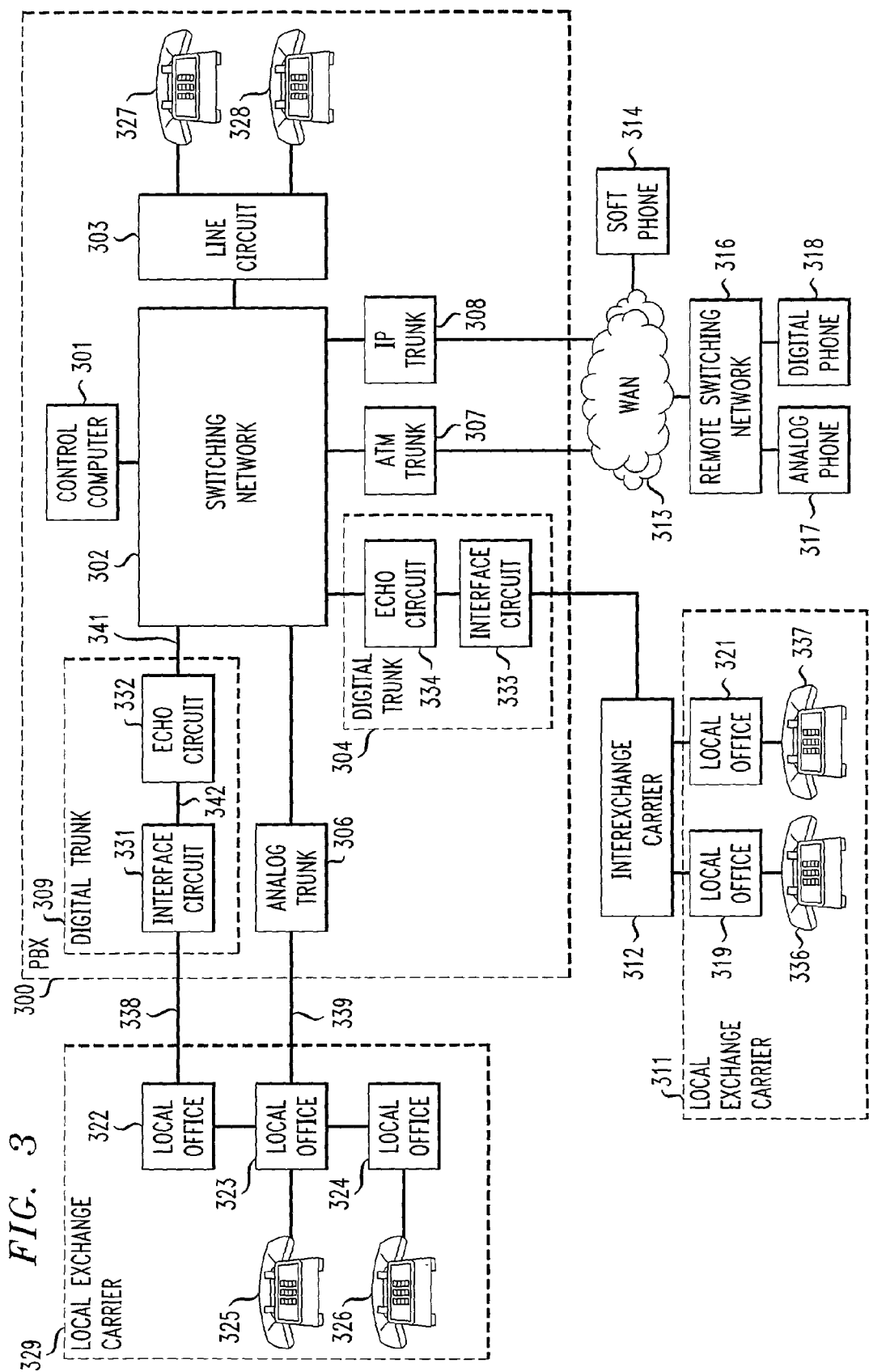
FIG. 3 illustrates, in block diagram form, a system for implementing an embodiment the invention.

FIG. 3 illustrates a system for implementing the invention. Local exchange carriers 311 and 329 comprise local offices 319 and 321–324 plus telephones connected to these local offices. Interexchange carrier 312 may be a plurality of interexchange carriers such as AT&T or Sprint. Wide area network (WAN) 313 can be a variety of communication media including but not limited to the Internet or an Intranet of a corporation in combination with ATM switching networks. PBX 300 comprises control computer 301, switching network 302, line circuits 303, telephone 327–328, Internet Protocol (IP) trunk 308, ATM trunk 307, and trunks 304, 306, and 309. PBX 300 also provides control and switching for remote switching network 316 and its attached soft phones 317 and 318. Remote switching network 316 has analog telephones, digital telephones and softphones connected to it. Soft phone 314 is also capable of being connected through WAN 313 to PBX 300.

In FIG. 3, WAN 313 comprises ATM switches and IP switching and transmission elements. WAN 313 has the longest transmission delays for transmitting voice information of any of the units illustrated in FIG. 3. In WAN 313, ATM switches have transmission delays measured in tens of milliseconds; whereas, IP switches and elements in the aggregate may have transmission delays measured in hundreds of milliseconds. As was set forth in the background of the invention section, the effects of an echo in voice information being transmitted through WAN 313 results in a variety of undesirable acoustic effects. In accordance with one aspect of the invention, the interfaces and trunk elements which interface with WAN 313 eliminate the echoes before transmission of the voice information to WAN 313.

Softphone 314 provides an echo cancellation circuit having an echo tail length of advantageously four milliseconds so as to eliminate the effects of an acoustic echo in the handset utilized with softphone 314. Thus, softphone 314 eliminates the near-end echo caused by acoustic echoes before these echoes are transmitted to WAN 313. Remote switching network 316 provides near-end echo cancellation for the analog and digital telephone connected to it before transmitting voice information via WAN 313. Since the echo cancellation functions provided by remote switching network 316 are designed to eliminate echoes resulting from the attached telephones, these echo cancellation functions can have echo tail length capabilities of approximately eight milliseconds since the echo path lengths to these sets are short.

Within PBX 300, ATM trunk 307 and IP trunk 308 provide, advantageously, echo cancellation circuits that have adjustable tail lengths so that the tail length for each individual call can be adjusted. FIG. 10 illustrates IP trunk 308 in greater detail. ATM trunk 307 would be of a similar design as that for IP trunk 308 with the similar external interface circuit to external interface circuit 1003 being modified for the ATM protocol requirements that are well known to one skilled in the art. The adjustable echo tail lengths allow a echo cancellation circuit to provide echo cancellation functions for a larger number of calls. Control computer 301 determines the adjustable echo tail length in an echo cancellation circuit in trunks 307 or 308 based on where the call is coming from. For example, telephone 326 attached to local exchange carrier 329 may require a longer tail length than the tail length required for telephone 327 attached directly to PBX 300 via line circuit 303. Note that a later example sets forth the proposition that neither telephone 327 nor 328 causes any echo; however, it is well-known to those skilled in the art that a telephone connected directly to a PBX may be at some distance from the PBX and may indeed have an echo. For example, if telephone 327 is an analog set, a four wire to two wire hybrid function is provided in line circuit 303. Note, that the four wire refers to the environment within switching network 302 or on digital trunks such as digital trunk 304. Here, both directions of transmission are separate; where as a two wire refers to the connection to telephone 327 where both direction of the transmission simultaneously occur over the same pair of wires. It is at the hybrid, where four to two wire conversion occurs, that, if the hybrid is not properly balanced, echo returns can occur.

Because of the large number of calls that can be handled by ATM trunk 307 and IP trunk 308, the echo cancellation circuits of these trunks may at times lack the processing capability of providing long enough echo tails for all of the calls being handled via these trunks. In that case, as is discussed in the next paragraph, the capabilities of digital trunks 304 and 309 can be utilized to provide echo cancellation functions for some of the calls being processed by ATM trunk 307 and IP trunk 308.

To provide near-end cancellation of the echoes being received from local exchange carrier 329 via trunks 338 and 339, digital trunks 309 and 304 are utilized. These digital trunks have echo cancellation circuits that have advantageously maximum echo tail lengths of 96 milliseconds that should handle the echoes resulting from local exchange carrier 329 before the voice information is transmitted via PBX 300 from local exchange carrier 329 to WAN 313. Note, one skilled in the art could readily envision that the echo tail lengths cancellation capabilities provided by digital trunks 304 and 309 could be increased. The echo cancellation circuits of the digital trunks are also controlled by control computer 301 to provide echo tails of varying lengths. This capability allows the echo cancellation circuits to provide the echo cancellation functions for a larger number of calls than if the echo tail length was fixed. The echo return delays encountered at the interface to trunks 338 and 339 connected to the local exchange carriers may in the majority of calls be of moderate or short lengths. However, because policies and policies of echoes within a given local exchange carrier are not uniform and are for the most part not subject to regulation, pathological echo paths may be encountered on given calls where delay paths can be long resulting in the need for long tail length cancellation to cover all cases. As will be described later, calls being received via analog trunk 306 utilize the echo cancellation circuits of digital trunks 304 or 309 as needed to provide near-end echo cancellation. In addition, if a call received via analog trunk 306 from local exchange carrier 329 is being transported through switching network 302 to WAN 313 via either ATM trunk 307 or IP trunk 308, then the echo cancellation functions of trunks 307 and 308 can be utilized to provide echo cancellation functions.

As is well-known in the art, interexchange carrier 312 normally provides echo cancellation with respect to local exchange carrier 311. However, if interexchange carrier 312 does not provide echo cancellation, then, PBX 300 may use digital trunks 304 and 309. In addition, ATM trunk 307 and IP trunk 308 can be utilized if the echo being received from interexchange carrier 312 is within the echo tail length capacity of the echo cancellation circuits of these trunks. Note, it is possible to have the echo cancellation circuit of digital trunk 309 or digital trunk 304 cascaded with the cancellation circuits of either ATM trunk 307 or IP trunk 308. In this situation, both echo cancellations perform their normal operation and do not interfere with each other. The echo canceller first traversed in a connection does the initial cancellation, if it has sufficient echo tail length cancellation capabilities relative to the echo encountered. Consider now in greater detail the trunk circuits of PBX 300. Analog trunk 306 is a prior art analog trunk that has no echo cancellation within the trunk itself. Within the prior art, if objectionable echoes should be encountered by the communication of calls from analog trunk 306 to local exchange carrier 329, an external echo canceller would be inserted in link 339. Digital trunks 304 and 309 provide integrated echo cancellation circuits that have long echo cancellation tail lengths which advantageously may be 96 msec. Interexchange carrier 312 may provide sufficient echo cancellation for its connections to local exchange carrier 311. However, local exchange carriers 311 and 329 may not provide adequate echo cancellation in their internal or external operations. Nor, in general, does WAN 313 provide any echo cancellation functions.

Echo cancellation circuits 332 and 334 of digital trunks 309 and 304, respectively, are versatile. For example, echo cancellation circuit 332 of digital trunk 309 can cancel echoes being caused by communication through local exchange carrier 329 to telephone 326 via local offices 322–324. This type of echo cancellation is referred to as forward echo cancellation because it is eliminating echoes being received on the digital trunk's outgoing link 338. Echo cancellation circuit 334 is identical in design to echo cancellation circuit 332. In addition, echo cancellation circuits 332 and 334 can be utilized to eliminate echoes in the reverse direction. This type of echo cancellation is referred to as reverse echo cancellation because it is eliminating echoes being received from switching network 302. The following is an example of echo circuit 334 being utilized in the reverse direction. If analog trunk 306 is communicating a call from telephone 326 in local exchange carrier 329 to interexchange carrier 312, it is necessary to eliminate the echo being caused by local exchange carrier 329 in PBX 300. This is done by echo circuit 334 eliminating the echo that is received via switching network 302, analog trunk 306 and local exchange carrier 329.

In addition, not every call being communicated through digital trunk 304 requires echo cancellation nor is it provided as is determined by control computer 301. For example, if telephone 327 is communicating a call to telephone 336 of local exchange carrier 311, interexchange carrier 312 eliminates any echo resulting from local exchange carrier 311. Hence, echo cancellation circuit 334 does not provide any echo cancellation; thus, saving valuable resources that can be utilized to cancel other echo sources.

Not only can echo cancellation circuits 332 and 334 be utilized both in the forward and reverse direction but they can be utilized as service circuits for eliminating echoes in calls not being communicated by their respective digital trunks. An example of this type of echo control is when telephone 327 is on a call with telephone 326 of local exchange carrier 329 via local offices 323–324, analog trunk 306, switching network 302, and line circuits 303. To eliminate the echo caused by local exchange carrier 329, the output of analog trunk 306 into switching network 302 is routed to echo cancellation circuit 334 via switching network 302. Echo cancellation circuits 334 eliminate the echo before the path is returned to switching network 302 and switched to telephone 327. Advantageously, digital trunk 304 can be eliminating echoes for a variety of calls being performed by analog trunk 306 as well as supplying any necessary echo cancellation with respect to interexchange carrier 312. Note, this is also true of digital trunk 309. Similarly, digital trunks 304 and 309 can provide additional echo cancellation for ATM trunk 307 and IP trunk 309.

Advantageously, the amount of echo cancellation provided by PBX 300 with respect to local exchange carriers 311 and 329 can be tailored to the amount of echo being received back by using different types of trunk circuits or by providing no echo cancellation. For example, connections via local office 323 to telephones such as telephone 325 may not have any echo; whereas, calls routed via local office 324 to a telephone connected directly to it such as telephone 326 may require echo cancellation. Control computer 301 can utilize the information of where the call is being routed within local exchange carrier 329 to provide or not provide echo cancellation.

Figure 1:
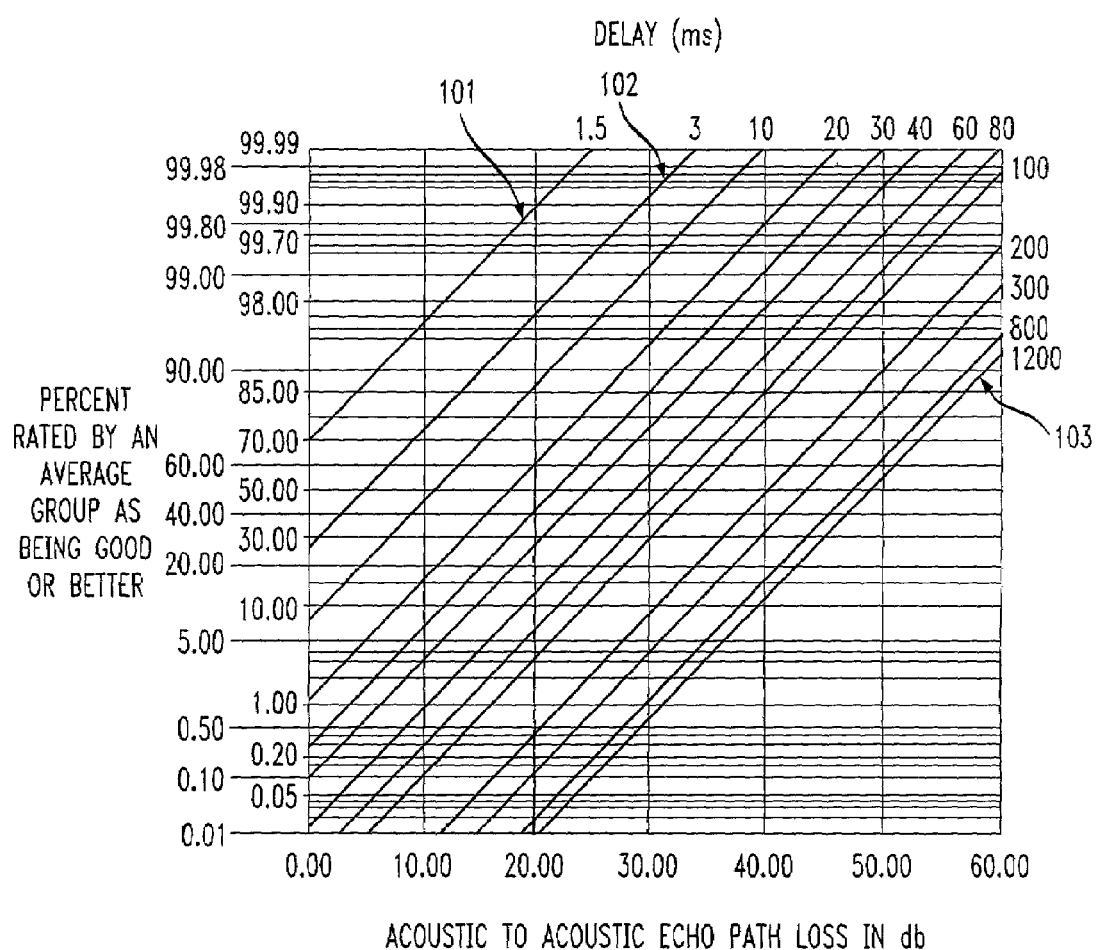
FIG. 1 illustrates a prior art graph that defines the relationship between human perception of echoes with respect to echo path loss and echo path delay.
Figure 2:
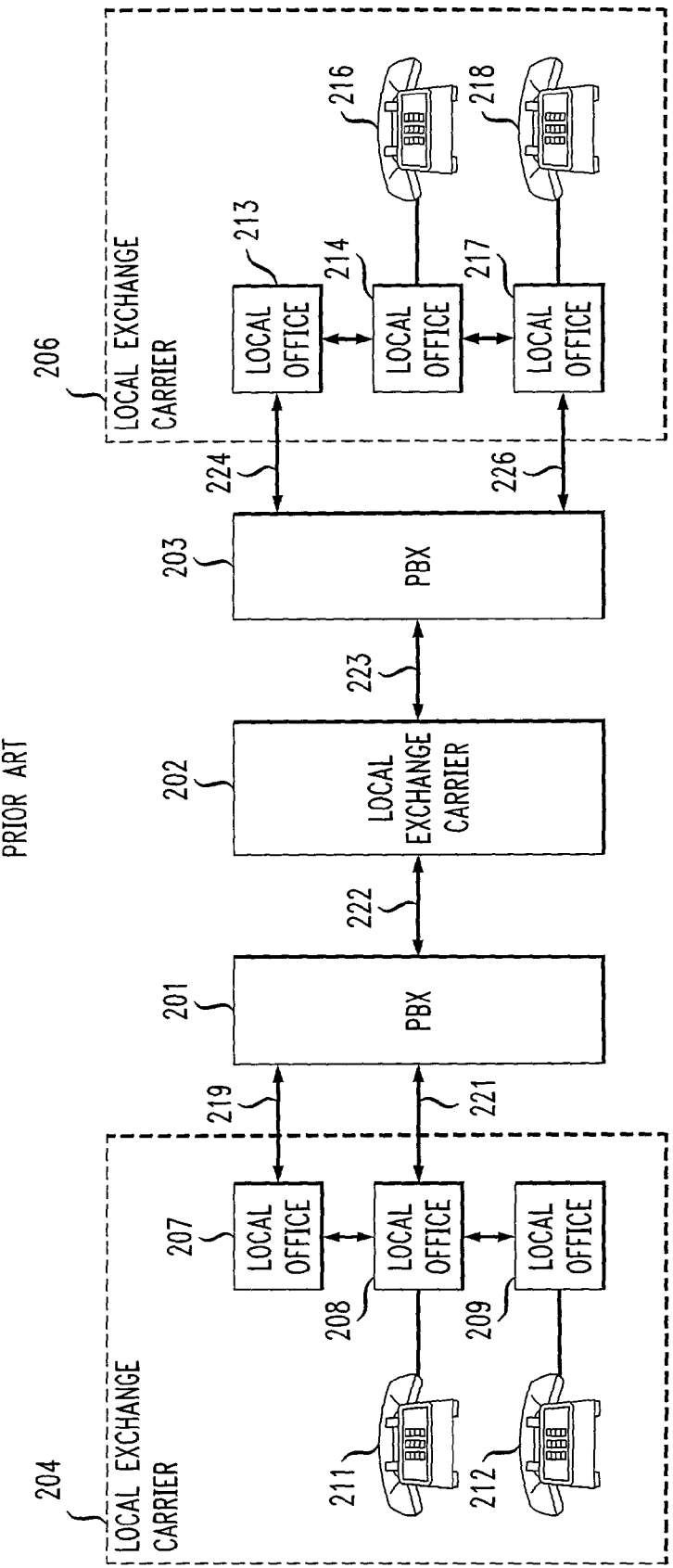
FIG. 2 illustrates a prior art switching system configuration.
Figure 4:
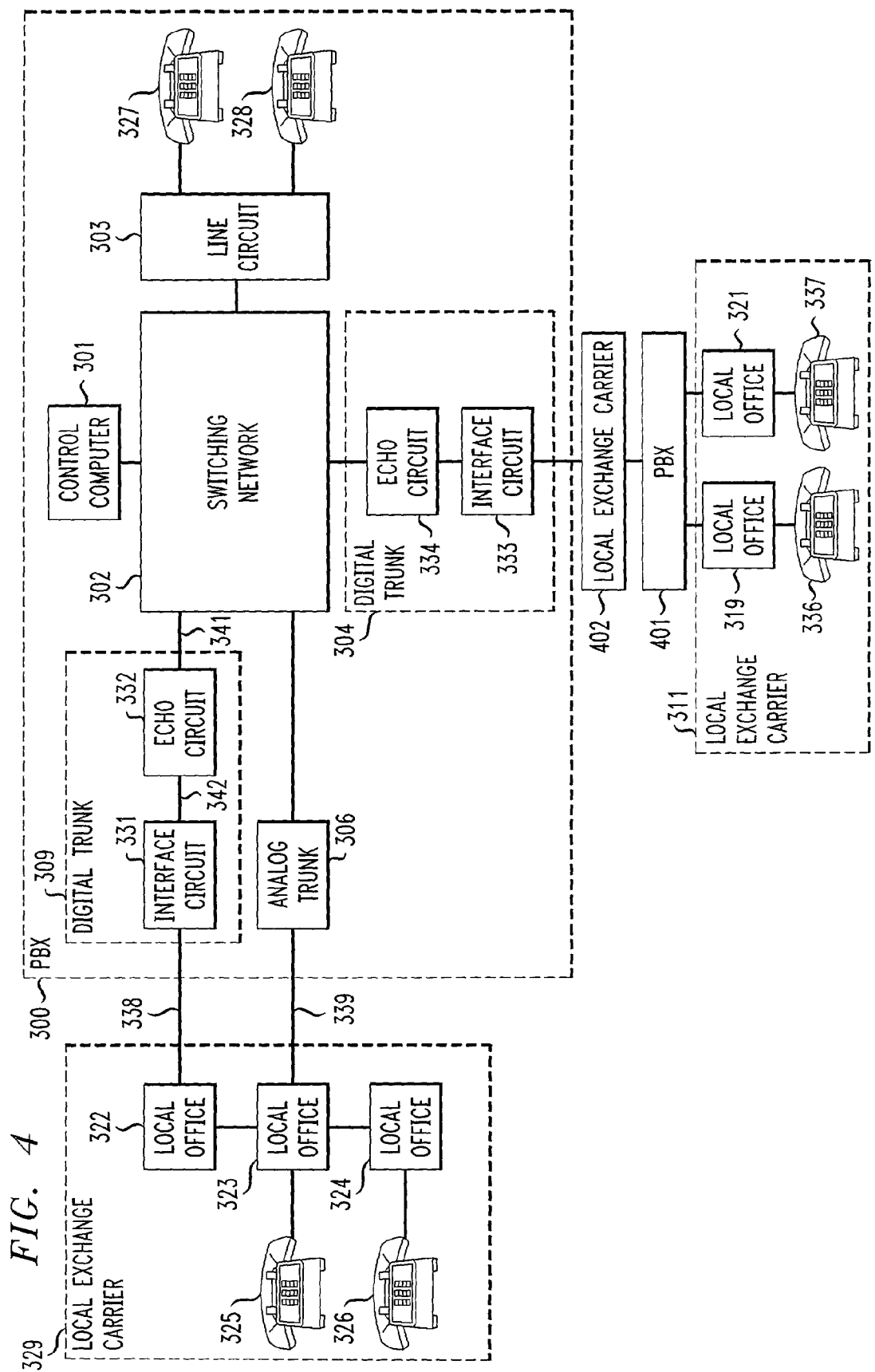
FIG. 4 illustrates, in block diagram form, a system for implementing an embodiment the invention.

FIG. 4 illustrates PBX 300 placed in the prior art situation that is depicted in FIG. 2. PBX 300 is communicating through a private line to PBX 401 via local exchange carrier 402. PBX 401 has only analog trunks to interconnect to local office 319 and local office 321 of local exchange carrier 311. As previously described with respect to FIG. 3, PBX 300 interconnects to local exchange carrier 329 via analog trunk 306 and digital trunk 309. For sake of example, it is assumed that PBX 401 does not have external echo cancellation circuits in its connections to local exchange carrier 311. As a first example, consider the situation where telephone 325 is communicating via local office 323 and analog trunk 306 on a telephone call established by PBX 300 to telephone 336 via digital trunk 304, local exchange carrier 402, PBX 401 and local office 319 of local exchange carrier 311. Assume that no echo is present on the path from switching network 302 to telephone 325, but an echo does occur in local exchange carrier 311 with respect to telephone 336. PBX 300 eliminates this echo by utilizing echo cancellation circuit 334 in the forward direction to eliminate the echo that is being received back from local exchange carrier 402 that is actually caused by local exchange carrier 311. By PBX 300 utilizing digital trunk 304 in the forward direction, a user of telephone 325 has no perception of an echo having occurred.

Consider a second example that also illustrates the utilization of the echo cancellers in PBX 300. Consider where a telephone call is established from telephone 326 via local office 324, local office 323, analog trunk 306 by PBX 300 to telephone 336 via digital trunk 304, local exchange carrier 402, PBX 401, and local office 319 of local exchange carrier 311. In this example, local exchange carrier 329 causes an echo on its portion of the telephone path, and local exchange carrier 311 introduces an echo in its portion of the telephone path. PBX 300 eliminates the echo resulting from local exchange carrier 311 by utilizing digital trunk 304 in the forward direction. To eliminate the echo being caused by local exchange carrier 329, PBX 300 utilizes a portion of echo cancellation circuit 332 as a service circuit to eliminate the echo being received by analog trunk 306 being received from local office 323. This is done by the voice communication received from local office 323 being routed through switching network 302 to echo cancellation circuit 332 which eliminates the echo and transmits the results back through switching network 302 to digital trunk 304.

Figure 5:
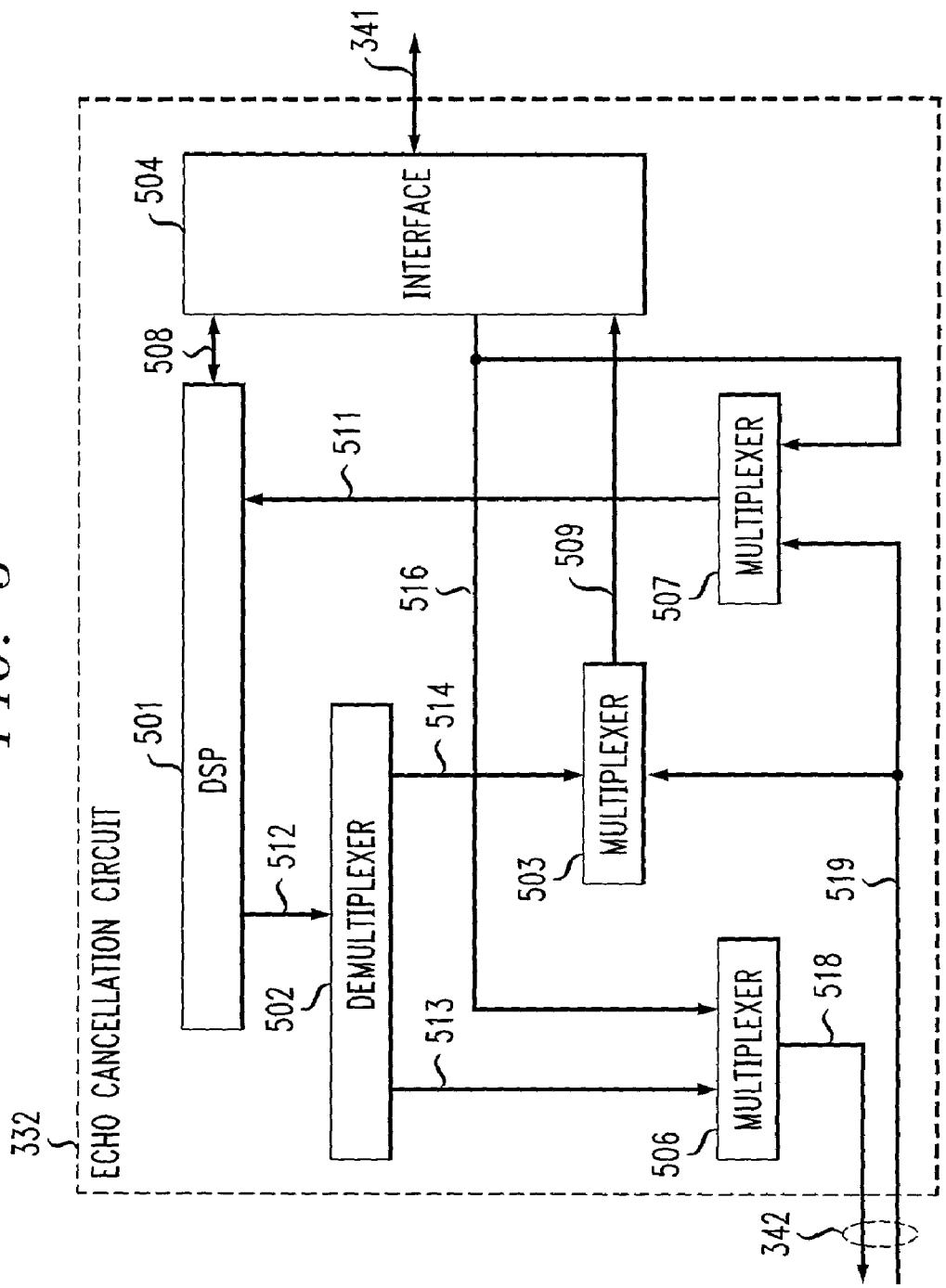
FIG. 5 illustrates, in block diagram form, an echo cancellation circuit.
Figure 6:
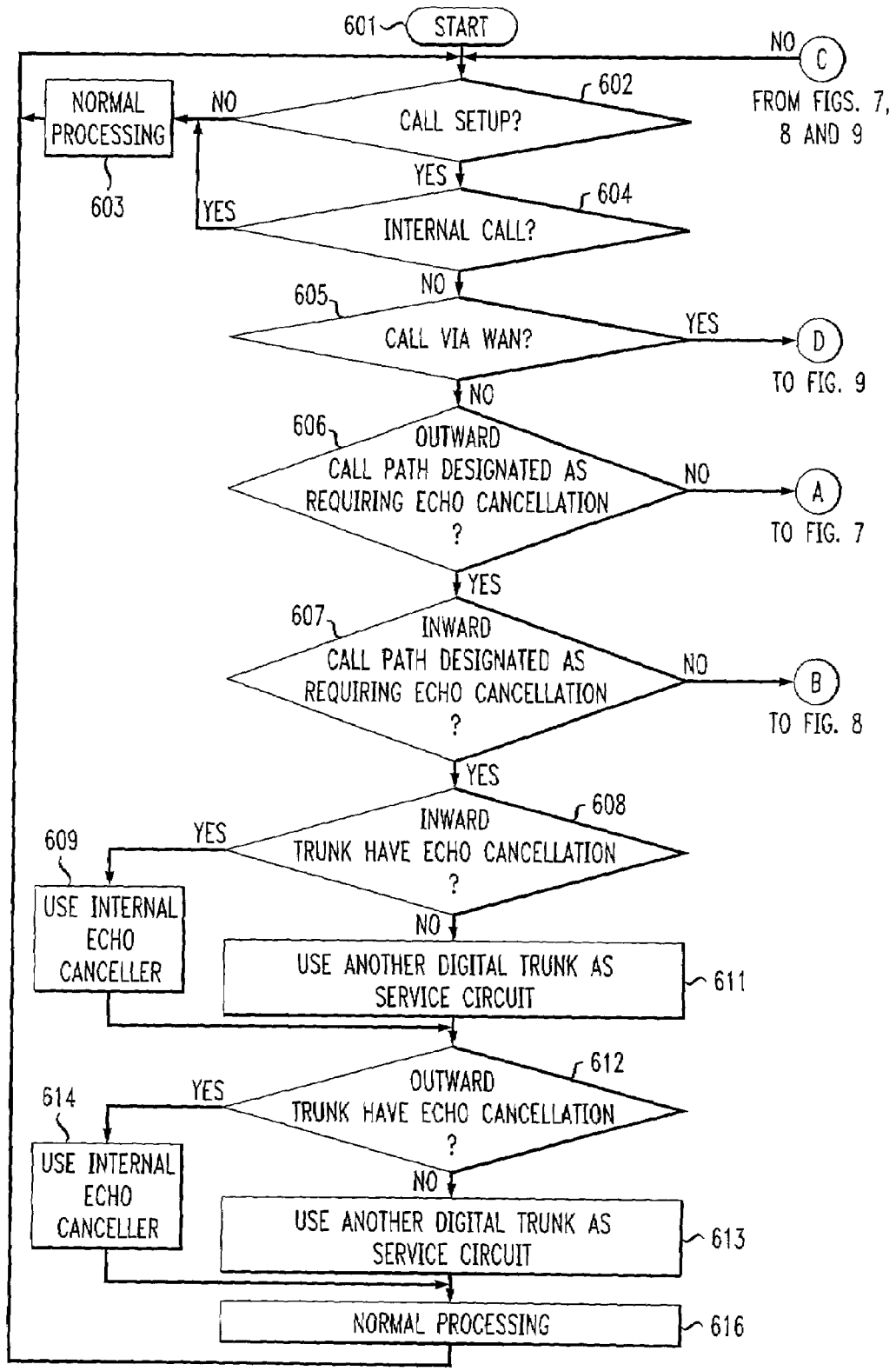
FIGS. 6–9 illustrate, in flow chart form, operations of a PBX.
Figure 7:
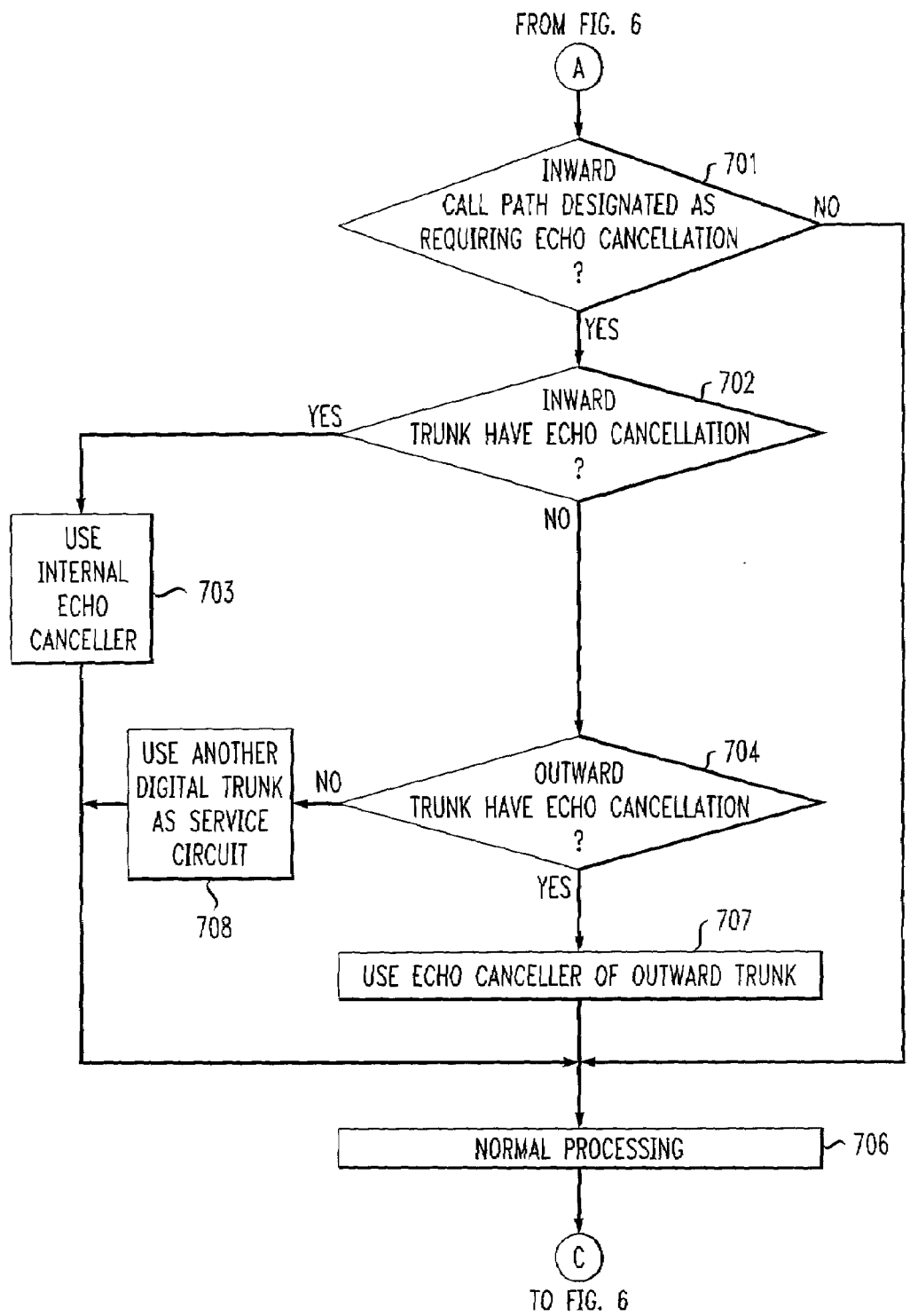
Figure 8:
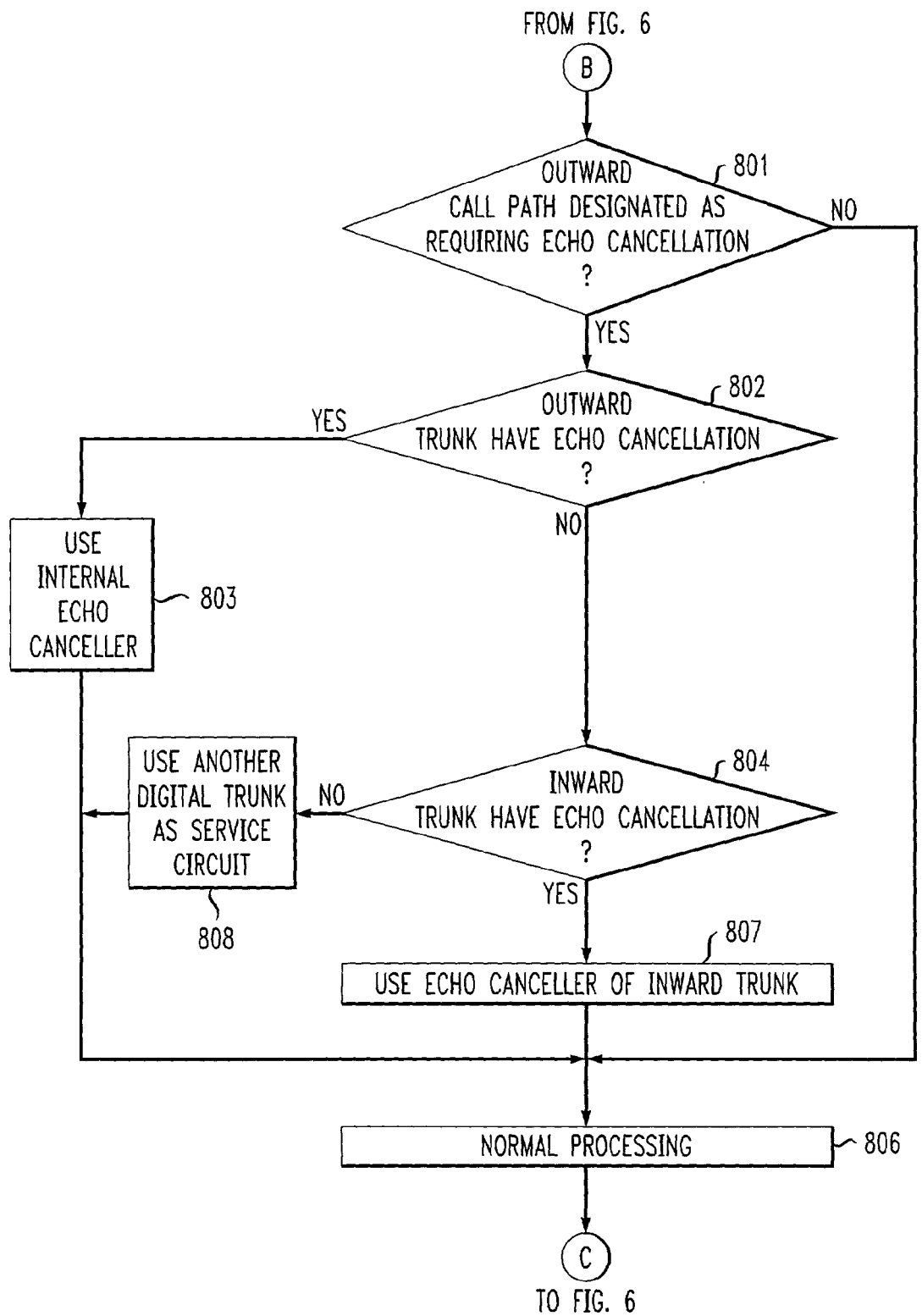

FIG. 5 illustrates, in block diagram form, echo cancellation circuit 332 of FIGS. 3 and 4. Echo cancellation circuits 334 of FIG. 3 and echo cancellation circuit 1002 of FIG. 10 are of a similar design. DSP 501 is illustrated as being a single DSP, but could be a group of DSPs. The echo canceller operations are performed by implementing a finite impulse response digital filter within DSP 501. The implementation of a finite impulse response digital filter for performing echo cancellation is well known by those skilled in the art. DSP 501 is responsive to information from control computer 301 designating the length of the echo tail to allocate resources to perform an echo canceller function that has a tail length as determined by control computer 301. Principally, the determination of the echo tail length is one of allotting memory within DSP 501 that is to be used to perform a particular echo cancellation function on a particular call. DSP 501 controls the operations of the different circuit blocks illustrated in FIG. 5 utilizing control information received from control computer 301 via interface 504 and cable 508. DSP 501 also transmits control information to control computer 301 via the same path. DSP 501 is also performing all of the control functions required of digital trunk 309. When echo cancellation circuit 332 is operating in the forward direction that is eliminating echoes being received via trunk 338, the information being received via cable 519 of link 342 is directed to DSP 501 via multiplexer 507, cable 511. The output of DSP 501 is transmitted to switching network 302 via cable 512, de-multiplexer 502, cable 514, multiplexer 503, cable 509, and interface 504. When echo cancellation circuit 332 is operating in the reverse direction, that is eliminating echoes being received from switching network 302 that are caused by external carriers or telephones, DSP 501 receives its input from interface 504, cable 516, multiplexer 507, and cable 511. DSP 501 transmits its output to interface circuit 316 via link 342 by transmission via cable 512, de-multiplexer 502, cable 513, multiplexer 506, and cable 518. When echo cancellation circuit 332 is being used as a service circuit by PBX 300, DSP 501 receives its input via interface 504, cable 516, multiplexer 507, cable 511. DSP 501 transmits the results back to switching network 302 via cable 512, demultiplexer 502, cable 514, multiplexer 503, cable 509, and interface 504.

FIGS. 6–9 illustrate, in flowchart form, the operations performed by control computer 301 to eliminate echoes. After being started in block 601, decision block 602 determines if a call is being set up. If the answer is no, control is transferred to block 603 which performs normal processing before returning control back to decision block 602. If the answer in decision block 602 is yes, decision block 604 determines whether the call is an internal call between telephones connected directly to PBX 300. If the answer is yes, control is transferred to block 603. In the following description, the terms inward and outward trunks are defined in the following manner. If a call is set up from telephone 325 of FIG. 3 into PBX 300 via analog trunk 306, analog trunk 306 is the inward trunk circuit. If this call is being set up to internal telephone 328, then there is no outward trunk. However, if the call from telephone 325 is being set up to telephone 336 via digital trunk 304, then, digital trunk 304 is the outward trunk circuit. If the answer in decision block 604 is no, decision block 605 determines whether the call is a call that is going to be communicated via WAN 313. If the answer is yes, control is transferred to decision block 901 of FIG. 9. If the answer is no in decision block 605, control is transferred to decision block 606. Decision block 606 examines internal tables that have been administered to determine if the outward path of the call requires echo cancellation. If the answer is no, control is transferred to decision block 701 of FIG. 7. If the answer in decision block 606 is yes, decision block 607 determines if the inward call path, is designated as requiring echo cancellation. If the answer is no, control is transferred to decision block 801 of FIG. 8. If the answer in decision block 607 is yes, decision block 608 determines if the inward trunk circuit has echo cancellation. At this point, it has been determined that both the outward and inward paths require echo cancellation operations. If the answer is no in decision block 607, block 611 obtains utilization of a portion of another digital trunk to serve as a service circuit to provide the echo cancellation operations before transferring control to decision block 612. If the answer in decision block 608 is yes, then block 609 properly utilizes the internal echo canceller of the inward trunk circuit before transferring control to decision block 612. Decision block 612 determines if the outward trunk circuit has echo cancellation. If the answer is no, block 613 uses another digital trunk as a service circuit before transferring control to block 616. If the answer in decision block 612 is yes, block 614 utilizes the internal echo canceller of the outward trunk circuit before transferring control to block 616. Block 616 performs normal call processing.

If the answer in decision block 606 is no that the outward call path is not designated as requiring echo cancellation, then it must be determined if the inward call path requires echo cancellation. If the answer in decision block 606 is no, control is transferred to decision block 701 of FIG. 7. Decision block 701 determines if the inward call path is designated as requiring echo cancellation. If the answer is no, control is transferred to block 706 which performs normal processing before returning control back to decision block 602 of FIG. 6. If the answer in decision block 701 is yes, decision block 702 determines if the inward trunk circuit has echo cancellation. If the answer is yes, block 703 utilizes this internal echo canceller before transferring control to block 706. If the answer in decision block 702 is no, decision block 704 determines if the outward trunk circuit for the call has an echo canceller. If the answer is yes, control is transferred to block 707 which utilizes the echo canceller of the outward trunk circuit before transferring control to block 706. If the answer in decision block 704 is no, control is transferred to block 708 which uses the echo canceller of another digital trunk as a service circuit before transferring control to block 706.

Returning to FIG. 6, if the answer in decision block 607 is no that the inward call path is not designated as requiring echo cancellation, then it must be determined if the outward call path requires echo cancellation. If the answer in decision block 607 is no, control is transferred to decision block 801 of FIG. 8. Decision block 801 determines if the outward call path is designated as requiring echo cancellation. If the answer is no, control is transferred to block 806 which performs normal processing before returning control back to decision block 602 of FIG. 6. If the answer in decision block 801 is yes, decision block 802 determines if the outward trunk circuit has echo cancellation. If the answer is yes, block 803 utilizes this internal echo canceller before transferring control to block 806. If the answer in decision block 802 is no, decision block 804 determines if the inward trunk circuit for the call has an echo canceller. If the answer is yes, control is transferred to block 807 which utilizes the echo canceller of the inward trunk circuit before transferring control to block 806. If the answer in decision block 804 is no, control is transferred to block 808 which uses the echo canceller of another digital trunk as a service circuit before transferring control to block 806.

Figure 9:
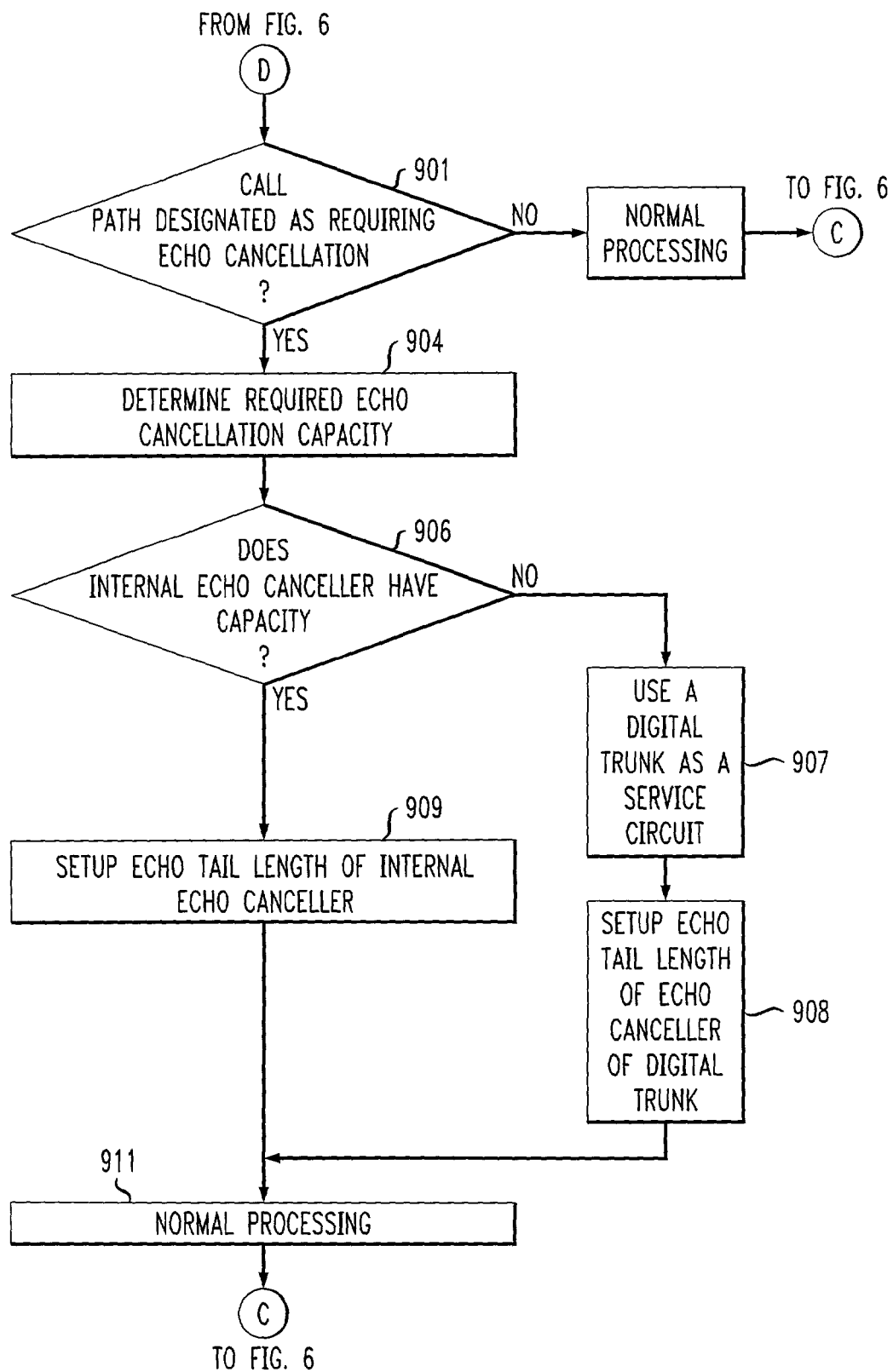

Returning to FIG. 6, if the answer in decision block 605 is yes, that the call is being communicated via WAN 313, then, control is transferred to decision block 901 of FIG. 9. Decision block 901 determines whether the call path either inward or outward requires echo cancellation. In most situations, echo cancellation is only provide for outward calls. If the answer is no, control is transferred to decision block 903 which performs normal processing before returning control back to decision block 602 of FIG. 6. If the answer is yes, decision block 904 determines the required echo cancellation capacity that is required of the DPS unit controlling the echo circuit. This determination is based on the amount of memory that is required for the echo tail length and the processing capacity. Decision block 906 then determines if the internal echo canceller has the required capabilities. For example, if the call is being routed through IP trunk 308, the determination would be made if echo circuit 1002 of FIG. 10 has sufficient capacity. If the answer is yes, decision block 909 performs the setup operation to initialize the DSP of the internal echo canceller for the proper echo tail length before transferring control to decision block 911. Decision block 911 performs normal processing before returning control back to decision block 602 of FIG. 6. Returning to decision block 906, if the answer is no, block 907 selects and uses a digital trunk such as digital trunk 309 as a service circuit. Then, decision block 908 sets up the echo tail length of the echo canceller of the digital trunk before transferring control to decision block 911.

FIG. 10 illustrate, in block diagram form, IP trunk 308 in greater detail. Internal interface circuit 1001 provides the interface to switching network 302, external interface circuit 1003 provides the interface to WAN 313, and echo cancellation circuit 1002 provides the echo cancellation functions. Internal interface circuit 1001 provides for interfacing to the time slot interchange subsystem of switching network 302 and in addition, provides for call conferencing and gain adjustments for telephone calls. The operations of internal interface circuit 1001 are well known to those skilled in the art.

External interface circuit 1003 provides for interfacing to WAN 313. These functions comprise all functions required for voice-over-IP such as compression of digital samples received from echo cancellation circuit 1002 and packetization of the received digital samples for transmission to WAN 313. External interface circuit 1003 is responsive to packets received from WAN 313 to perform depacketization, decompression, and error recovery, etc. The operations of external interface circuit 1003 are well known to those skilled in the art.

Echo cancellation circuit 1002 is identical in design to echo cancellation circuit 332.

Of course, various changes and modifications to the illustrative embodiment described above will be apparent to those skilled in the art. These changes and modifications can be made without departing from the spirit and scope of the invention and without diminishing its intended advantages. It is therefore intended that such changes and modifications be covered by the following claims except insofar as limited by the prior art.

What is claimed is:

1. A method for controlling echoes within a telecommunication switching system having a plurality of local exchange carriers and a plurality of local telecommunication switches where each of the plurality of local exchange carriers is connected to a plurality of telephone sets attached to a plurality of local telephone switching offices of each of the plurality of local exchange carriers and each of the plurality of local telecommunication switches is connected to a plurality of telephone sets, comprising the steps of:
   receiving by one of the plurality of local telecommunication switches a call setup message from one of a first plurality of telephone sets connected to one of a first plurality of local exchange carriers with a first trunk circuit interconnecting the one of the plurality of local telecommunication switches with the one of the first plurality of local exchange carriers;
   determining by the one of the plurality of local telecommunication switches that the call setup message designates one of a second plurality of telephone sets connected to one of a second plurality of local exchange carriers as a destination of the call setup message;
   determining by the one of the plurality of local telecommunication switches in response to the call setup message that a first one of a first plurality of local telephone switching offices of the one of the first plurality of local exchange carriers to which the one of the first plurality of telephone sets is connected requires echo cancellation operations;
   providing by the one of the plurality of local telecommunication switches in response to the determination that echo cancellation operations are required for the first one of the first plurality of local telephone switching offices echo cancellation operations for a first call path from the one of the plurality of local telecommunication switches to the first one of the first plurality of the local telephone switching offices of the first one of the plurality of local exchange carries; and
   adjusting the echo cancellation capabilities of the first trunk circuit with respect to an echo tail length upon the first call path being established.

2. The method of claim 1 wherein the step of providing comprises the steps of verifying that the first trunk circuit has echo cancellation capabilities;
   activating the first trunk circuit to provide echo cancellation operations on the first call path.

3. The method of claim 2 wherein the step of providing comprises the step of adjusting the echo cancellation capabilities of the first trunk circuit with respect to an echo tail length for the first call path.

4. The method of claim 1 wherein the one of the plurality of local telecommunication switches comprises a switching network to which the first trunk circuit, a second trunk circuit, and a third trunk circuit are connected where the third trunk circuit is part of a second call path from the one of the plurality of local telecommunication switches to the first one of the second plurality of local telephone switching offices of the one of the second plurality of local exchange carriers and the step of providing comprises the steps of verifying that the second trunk circuit has echo cancellation capabilities;
   establishing an internal path from the first and second call paths through the first trunk circuit, switching network, second trunk circuit, switching network and third trunk circuit; and
   enabling the second trunk circuit to provide echo cancellation operations on audio information coming from the third trunk circuit.

5. The method of claim 4 wherein the step of providing comprises the step of adjusting the echo cancellation capabilities of the second trunk circuit with respect to an echo tail length for the second call path.

6. The method of claim 1 wherein the one of the plurality of local telecommunication switches comprises a switching network to which the first trunk circuit and a second trunk circuit are connected where the second trunk circuit is part of a second call path from the one of the plurality of local telecommunication switches to the first one of the second plurality of local telephone switching offices of the one of the second plurality of local exchange carriers and the step of providing comprises the steps of verifying that the second trunk circuit has echo cancellation capabilities;
   establishing an internal path from the first and second call paths through the first trunk circuit, switching network and second trunk circuit; and
   enabling the second trunk circuit to provide echo cancellation operations on audio information coming from the first trunk circuit.

7. The method of claim 6 wherein the step of providing comprises the step of adjusting the echo cancellation capabilities of the first trunk circuit with respect to an echo tail length for the first call path.

8. The method of claim 1 wherein the one of the plurality of local telecommunication switches comprises a switching network to which the first trunk circuit, a second trunk circuit and a third trunk circuit are connected where the third trunk circuit is part of a second call path from the one of the plurality of local telecommunication switches to the first one of the second plurality of local telephone switching offices of the one of the second plurality of local exchange carriers and the step of providing comprises the steps of verifying that the second trunk circuit has echo cancellation capabilities;
   establishing an internal path from the first and second call paths through the first trunk circuit, switching network, second trunk circuit, switching network and third trunk circuit;
   enabling the second trunk circuit to provide echo cancellation operations on audio information coming from the first trunk circuit;
   determining by the one of the plurality of local telecommunication switches in response to the call setup message that a first one of the plurality of local telephone switching offices of the one of the second plurality of local exchange carriers to which the one of the second plurality of telephone sets is connected requires echo cancellation operations; and enabling the third trunk circuit to provide echo cancellation operations on audio information coming from the second call path.

9. The method of claim 8 wherein the step of providing comprises the step of adjusting the echo cancellation capabilities of the third trunk circuit with respect to an echo tail length for the second call path.

10. The method of claim 1 wherein the one of the plurality of local telecommunication switches comprises a switching network to which the first trunk circuit and a second trunk circuit are connected where the second trunk circuit is part of a second call path from the one of the plurality of local telecommunication switches to the first one of the second plurality of local telephone switching offices of the one of the second plurality of local exchange carriers and the step of providing comprises the steps of verifying that the second trunk circuit has echo cancellation capabilities;

establishing an internal path from the first and second call paths through the first trunk circuit, switching network, and second trunk circuit;

enabling the first trunk circuit to provide echo cancellation operations on audio information coming from the first call path;

determining by the one of the plurality of local telecommunication switches in response to the call setup message that the first one of the second plurality of local telephone switching offices of the one of the second plurality of local exchange carriers to which the one of the second plurality of telephone sets is connected requires echo cancellation operations; and enabling the second trunk circuit to provide echo cancellation operations on audio information coming from the second call path.

11. The method of claim 10 wherein the step of providing comprises the step of adjusting the echo cancellation capabilities of the second trunk circuit with respect to an echo tail length for the second call path.

12. A method for controlling echoes within a telecommunication switching system having a plurality of local exchange carriers, and a plurality of local telecommunication switches where each of the plurality of local exchange carriers is connected to a plurality of telephone sets attached to a plurality of local telephone switching offices of each of the plurality of local exchange carriers and each of the plurality of local telecommunication switches is connected to a plurality of telephone sets and a first and second ones of the plurality of local telecommunication switches interconnected by a third plurality of local exchange carriers, comprising the steps of:

receiving by one of the plurality of local telecommunication switches a call setup message from one of a first plurality of telephone sets connected to one of a first plurality of local exchange carriers via the third plurality of local exchange carriers and the second one of the plurality of local telecommunication switches and a first trunk circuit interconnecting the first one of the plurality of local telecommunication switches with the third one of the plurality of local exchange carriers;

determining by the first one of the plurality of local telecommunication switches that the call setup message designates one of a second plurality of telephone sets connected to one of a second plurality of local telephone switching offices of one of a second plurality of local exchange carriers as a destination of the call setup message;

determining by the first one of the plurality of local telecommunication switches in response to the call setup message that a first one of a first plurality of local telephone switching offices of the one of the first plurality of local exchange carriers to which the one of the first plurality of telephone sets is connected requires echo cancellation operations;

providing by the first one of the plurality of local telecommunication switches in response to the determination that echo cancellation operations are required for the first one of the first plurality of local telephone switching offices echo cancellation operations for a first call path from the first one of the plurality of local telecommunication switches to the first one of the first plurality of the local telephone switching offices of the first one of the plurality of local exchange carriers; and adjusting the echo cancellation capabilities of the first trunk circuit with respect to an echo tail length upon the first call path being established.

13. The method of claim 12 wherein the step of providing comprises the steps of verifying that the first trunk circuit has echo cancellation capabilities;

activating the first trunk circuit to provide echo cancellation operations on the first call path.

14. The method of claim 12 wherein the first one of the plurality of local telecommunication switches comprises a switching network to which the first trunk circuit, a second trunk circuit, and a third trunk circuit are connected where the third trunk circuit is part of a second call path from the first one of the plurality of local telecommunication switches to the first one of the second plurality of local telephone switching offices of the one of the second plurality of local exchange carriers and the step of providing comprises the steps of verifying that the second trunk circuit has echo cancellation capabilities;

establishing an internal path from the first and second call paths through the first trunk circuit, switching network, second trunk circuit, switching network and third trunk circuit; and enabling the second trunk circuit to provide echo cancellation operations on audio information coming from the first trunk circuit.

15. The method of claim 12 wherein the first one of the plurality of local telecommunication switches comprises a switching network to which the first trunk circuit and a second trunk circuit are connected where the second trunk circuit is part of a second call path from the first one of the plurality of local telecommunication switches to the first one of the second plurality of local telephone switching offices of the one of the second plurality of local exchange carriers and the step of providing comprises the steps of verifying that the second trunk circuit has echo cancellation capabilities;

establishing an internal path from the first and second call paths through the first trunk circuit, switching network and second trunk circuit; and enabling the second trunk circuit to provide echo cancellation operations on audio information coming from the first trunk circuit.

16. The method of claim 12 wherein the first one of the plurality of local telecommunication switches comprises a switching network to which the first trunk circuit, a second trunk circuit, and a third trunk circuit are connected where the third trunk circuit is part of a second call path from the first one of the plurality of local telecommunication switches to the first one of the second plurality of local telephone switching offices of the one of the second plurality of local exchange carriers and the step of providing comprises the steps of verifying that the second trunk circuit has echo cancellation capabilities;

establishing an internal path from the first and second call paths through the first trunk circuit, switching network, second trunk circuit, switching network and third trunk circuit;

enabling the second trunk circuit to provide echo cancellation operations on audio information coming from the first trunk circuit;

determining by the first one of the plurality of local telecommunication switches in response to the call setup message that a first one of the second plurality of local telephone switching offices of the one of the second plurality of local exchange carriers to which the one of the second plurality of telephone sets is connected requires echo cancellation operations; and enabling the third trunk circuit to provide echo cancellation operations on audio information coming from the second call path.

17. The method of claim 12 wherein the first one of the plurality of local telecommunication switches comprises a switching network to which the first trunk circuit and a second trunk circuit are connected where the second trunk circuit is part of a second call path from the first one of the plurality of local telecommunication switches to the first one of the second plurality of local telephone switching offices of the one of the second plurality of local exchange carriers and the step of providing comprises the steps of verifying that the second trunk circuit has echo cancellation capabilities;

establishing an internal path from the first and second call paths through the first trunk circuit, switching network, and second trunk circuit;

enabling the first trunk circuit to provide echo cancellation operations on audio information coming from the first call path;

determining by the first one of the plurality of local telecommunication switches in response to the call setup message that the first one of the second plurality of local telephone switching offices of the one of the second plurality of local exchange carriers to which the one of the second plurality of telephone sets is connected requires echo cancellation operations; and enabling the second trunk circuit to provide echo cancellation operations on audio information coming from the second call path.

18. A method for controlling echoes within a telecommunication switching system having a plurality of local exchange carriers, a wide area network, pluralities of softphones, a plurality of remote switches, and a plurality of local telecommunication switches where each of the plurality of local exchange carriers is connected to a plurality of telephone sets attached to a plurality of local telephone switching offices of each of the plurality of local exchange carriers and each of the plurality of local telecommunication switches is connected to a plurality of telephone sets and each of the plurality of remote switches is connected to a first plurality of softphones, comprising the steps of:

connecting the plurality of remote switches to each of the plurality of local telecommunication switches via the wide area network;

providing echo cancellation circuits in each of the plurality of remote switches with each echo cancellation circuit having an echo tail length adjusted to eliminate an echo produced by each of the first plurality of softphones;

connecting each of a second plurality of softphones to each of the plurality of local telecommunication switches via the wide area network;

providing an echo cancellation circuit in each of the second plurality of softphones having an echo tail length adjusted to eliminate an echo produced by each of the second plurality of softphones;

connecting one of the plurality of local exchange carriers to the wide area network via one of the plurality of local telecommunication switches with the one of the plurality of local exchange carriers interconnected to the one of the plurality of local telecommunication switches by a plurality of trunk circuits in the one of the plurality of local telecommunication switches;

providing echo cancellation operations in each of the plurality of trunk circuits adjusted to eliminate echoes produced by the one of the plurality of local exchange carriers on an individual call path basis; and adjusting the echo cancellation capabilities of the first trunk circuit with respect to an echo tail length upon the first call path being established.

19. The method of claim 18 wherein the step of providing echo cancellation operation in each of the plurality of trunk circuits comprises the steps of determining by the one of the plurality of local telecommunication switches that a call setup message received from the one of the plurality of local exchange carriers via one of the plurality of trunk circuits designates one of the first plurality of softphones connected to the one of the plurality of the local exchange carriers;

determining by the one of the plurality of local telecommunication switches in response to the call setup message that a first one of a plurality of local telephone switching offices of the one of the first plurality of local exchange carriers to which the one of the plurality of telephone sets is connected requires echo cancellation operations; and enabling the one of the plurality of trunk circuits to provide an echo cancellation operation for a telephone call associated with the call setup message.

20. The method of claim 18 wherein the one of the plurality of local telecommunication switches is connected to the wide area network by a Internet Protocol trunk circuit and the step of providing the echo cancellation operation further comprises providing an additional echo cancellation operation in the Internet Protocol trunk circuit.

21. The method of claim 18 wherein the one of the plurality of local telecommunication switches is connected to the wide area network by a Internet Protocol trunk circuit and the step of providing echo cancellation operation in the Internet Protocol trunk circuit comprises the steps of determining by the one of the plurality of local telecommunication switches that a call setup message received from the one of the plurality of local exchange carriers via one of the plurality of trunk circuits designates one of the first plurality of softphones connected to the one of the plurality of the local exchange carriers;

determining by the one of the plurality of local telecommunication switches in response to the call setup message that a first one of a plurality of local telephone switching offices of the one of the first plurality of local exchange carriers to which the one of the plurality of telephone sets is connected requires echo cancellation operations; and enabling the Internet Protocol trunk circuit to provide an echo cancellation operation for a telephone call associated with the call setup message.

22. The method of claim 21 wherein the step of providing comprises the step of adjusting the echo cancellation capabilities of the Internet Protocol trunk circuit with respect to an echo tail length for the first call path.

23. The method of claim 22 wherein the step of providing the echo cancellation operation further comprises providing an additional echo cancellation operation in the one of the plurality of trunk circuits.

24. The method of claim 23 wherein the step of further providing comprises the step of adjusting the echo cancellation capabilities of the one of the plurality of trunk circuits.

25. The method of claim 18 wherein the one of the plurality of local telecommunication switches is connected to the wide area network by a Internet Protocol trunk circuit and the step of providing echo cancellation operation in the Internet Protocol trunk circuit comprises the steps of further determining by the one of the plurality of local telecommunication switches that another call setup message received from the one of the plurality of local exchange carriers via one of the plurality of trunk circuits designates one of the second plurality of softphones connected to the one of the plurality of the local exchange carriers;
   determining by the one of the plurality of local telecommunication switches in response to the call setup message that a first one of a plurality of local telephone switching offices of the one of the first plurality of local exchange carriers to which the one of the plurality of telephone sets is connected requires echo cancellation operations; and
   enabling the Internet Protocol trunk circuit to provide an echo cancellation operation for a telephone call associated with the other call setup message.

26. The method of claim 25 wherein the step of providing comprises the step of adjusting the echo cancellation capabilities of the Internet Protocol trunk circuit with respect to an echo tail length for the first call path.

27. The method of claim 26 wherein the step of providing the echo cancellation operation further comprises providing an additional echo cancellation operation in the one of the plurality of trunk circuits.

28. The method of claim 27 wherein the step of further providing comprises the step of adjusting the echo cancellation capabilities of the one of the plurality of trunk circuits.

29. An apparatus for controlling echoes within a telecommunication switching system having a plurality of local exchange carriers and a plurality of local telecommunication switches where each of the plurality of local exchange carriers is connected to a plurality of telephone sets attached to a plurality of local telephone switching offices of each of the plurality of local exchange carriers and each of the plurality of local telecommunication switches is connected to a plurality of telephone sets, comprising:
   means for receiving by one of the plurality of local telecommunication switches a call setup message from one of a first plurality of telephone sets connected to one of a first plurality of local exchange carriers with a first trunk circuit interconnecting the one of the plurality of local telecommunication switches with the one of the first plurality of local exchange carriers;
   means for determining by the one of the plurality of local telecommunication switches that the call setup message designates one of a second plurality of telephone sets connected to one of a second plurality of local exchange carriers as a destination of the call setup message;
   means for determining by the one of the plurality of local telecommunication switches in response to the call setup message that a first one of a first plurality of local telephone switching offices of the one of the first plurality of local exchange carriers to which the one of the first plurality of telephone sets is connected requires echo cancellation operations;
   means for providing by the one of the plurality of local telecommunication switches in response to the determination that echo cancellation operations are required for the first one of the first plurality of local telephone switching offices echo cancellation operations for a first call path from the one of the plurality of local telecommunication switches to the first one of the first plurality of the local telephone switching offices of the first one of the plurality of local exchange carries; and
   means for adjusting the echo cancellation capabilities of the first trunk circuit with respect to an echo tail length upon the first call path being established.

30. The apparatus of claim 29 wherein the means for providing comprises means for verifying that the first trunk circuit has echo cancellation capabilities;
   means for activating the first trunk circuit to provide echo cancellation operations on the first call path.

31. The apparatus of claim 30 wherein the means for providing comprises means for adjusting the echo cancellation capabilities of the first trunk circuit with respect to an echo tail length for the first call path.

32. The apparatus of claim 29 wherein the one of the plurality of local telecommunication switches comprises a switching network to which the first trunk circuit, a second trunk circuit, and a third trunk circuit are connected where the third trunk circuit is part of a second call path from the one of the plurality of local telecommunication switches to the first one of the second plurality of local telephone switching offices of the one of the second plurality of local exchange carriers and the means for providing comprises means for verifying that the second trunk circuit has echo cancellation capabilities;
   means for establishing an internal path from the first and second call paths through the first trunk circuit, switching network, second trunk circuit, switching network and third trunk circuit; and
   means for enabling the second trunk circuit to provide echo cancellation operations on audio information coming from the third trunk circuit.

33. The apparatus of claim 32 wherein the means for providing comprises means for adjusting the echo cancellation capabilities of the second trunk circuit with respect to an echo tail length for the second call path.

34. The apparatus of claim 29 wherein the one of the plurality of local telecommunication switches comprises a switching network to which the first trunk circuit and a second trunk circuit are connected where the second trunk circuit is part of a second call path from the one of the plurality of local telecommunication switches to the first one of the second plurality of local telephone switching offices of the one of the second plurality of local exchange carriers and the means for providing comprises means for verifying that the second trunk circuit has echo cancellation capabilities;
   means for establishing an internal path from the first and second call paths through the first trunk circuit, switching network and second trunk circuit; and means for enabling the second trunk circuit to provide echo cancellation operations on audio information coming from the first trunk circuit.

35. The apparatus of claim 34 wherein the means for providing comprises means for adjusting the echo cancellation capabilities of the first trunk circuit with respect to an echo tail length for the first call path.

36. The apparatus of claim 29 wherein the one of the plurality of local telecommunication switches comprises a switching network to which the first trunk circuit, a second trunk circuit, and a third trunk circuit are connected where the third trunk circuit is part of a second call path from the one of the plurality of local telecommunication switches to the first one of the second plurality of local telephone switching offices of the one of the second plurality of local exchange carriers and the means for providing comprises means for verifying that the second trunk circuit has echo cancellation capabilities;

means for establishing an internal path from the first and second call paths through the first trunk circuit, switching network, second trunk circuit, switching network and third trunk circuit;

means for enabling the second trunk circuit to provide echo cancellation operations on audio information coming from the first trunk circuit;

means for determining by the one of the plurality of local telecommunication switches in response to the call setup message that a first one of the plurality of local telephone switching offices of the one of the second plurality of local exchange carriers to which the one of the second plurality of telephone sets is connected requires echo cancellation operations; and means for enabling the third trunk circuit to provide echo cancellation operations on audio information coming from the second call path.

37. The apparatus of claim 36 wherein the means for providing comprises means for adjusting the echo cancellation capabilities of the third trunk circuit with respect to an echo tail length for the second call path.

38. An apparatus for controlling echoes within a telecommunication switching system having a plurality of local exchange carriers, a wide area network, pluralities of softphones, a plurality of remote switches, and a plurality of local telecommunication switches where each of the plurality of local exchange carriers is connected to a plurality of telephone sets attached to a plurality of local telephone switching offices of each of the plurality of local exchange carriers and each of the plurality of local telecommunication switches is connected to a plurality of telephone sets and each of the plurality of remote switches is connected to a first plurality of softphones, comprising:

means for connecting the plurality of remote switches to each of the plurality of local telecommunication switches via the wide area network;

means for providing echo cancellation circuits in each of the plurality of remote switches with each echo cancellation circuit having an echo tail length adjusted to eliminate an echo produced by each of the first plurality of softphones;

means for connecting each of a second plurality of softphones to each of the plurality of local telecommunication switches via the wide area network;

means for providing an echo cancellation circuit in each of the second plurality of softphones having an echo tail length adjusted to eliminate an echo produced by each of the second plurality of softphones;

means for connecting one of the plurality of local exchange carriers to the wide area network via one of the plurality of local telecommunication switches with the one of the plurality of local exchange carriers interconnected to the one of the plurality of local telecommunication switches by a plurality of trunk circuits in the one of the plurality of local telecommunication switches;

means for providing echo cancellation operations in each of the plurality of trunk circuits adjusted to eliminate echoes produced by the one of the plurality of local exchange carriers on an individual call path basis; and means for adjusting the echo cancellation capabilities of the first trunk circuit with respect to an echo tail length upon the first call path being established.

39. The apparatus of claim 38 wherein the means for providing echo cancellation operation in each of the plurality of trunk circuits comprises means for determining by the one of the plurality of local telecommunication switches that a call setup message received from the one of the plurality of local exchange carriers via one of the plurality of trunk circuits designates one of the first plurality of softphones connected to the one of the plurality of the local exchange carriers;

means for determining by the one of the plurality of local telecommunication switches in response to the call setup message that a first one of a plurality of local telephone switching offices of the one of the first plurality of local exchange carriers to which the one of the plurality of telephone sets is connected requires echo cancellation operations; and means for enabling the one of the plurality of trunk circuits to provide an echo cancellation operation for a telephone call associated with the call setup message.

40. The apparatus of claim 38 wherein the one of the plurality of local telecommunication switches is connected to the wide area network by a Internet Protocol trunk circuit and the means for providing the echo cancellation operation further comprises providing an additional echo cancellation operation in the Internet Protocol trunk circuit.

41. The apparatus of claim 38 wherein the one of the plurality of local telecommunication switches is connected to the wide area network by a Internet Protocol trunk circuit and the means for providing echo cancellation operation in the Internet Protocol trunk circuit comprises means for determining by the one of the plurality of local telecommunication switches that a call setup message received from the one of the plurality of local exchange carriers via one of the plurality of trunk circuits designates one of the first plurality of softphones connected to the one of the plurality of the local exchange carriers;

means for determining by the one of the plurality of local telecommunication switches in response to the call setup message that a first one of a plurality of local telephone switching offices of the one of the first plurality of local exchange carriers to which the one of the plurality of telephone sets is connected requires echo cancellation operations; and means for enabling the Internet Protocol trunk circuit to provide an echo cancellation operation for a telephone call associated with the call setup message.

42. The apparatus of claim 41 wherein the means for providing comprises means for adjusting the echo cancellation capabilities of the Internet Protocol trunk circuit with respect to an echo tail length for the first call path.

43. The apparatus of claim 42 wherein the means for providing the echo cancellation operation further comprises providing an additional echo cancellation operation in the one of the plurality of trunk circuits.

44. The apparatus of claim 43 wherein the means for providing comprises further adjusting the echo cancellation capabilities of the one of the plurality of trunk circuits.

45. The apparatus of claim 38 wherein the one of the plurality of local telecommunication switches is connected to the wide area network by a Internet Protocol trunk circuit and the means for providing echo cancellation operation in the Internet Protocol trunk circuit comprises means for further determining by the one of the plurality of local telecommunication switches that another call setup message received from the one of the plurality of local exchange carriers via one of the plurality of trunk circuits designates one of the second plurality of softphones connected to the one of the plurality of the local exchange carriers;

means for determining by the one of the plurality of local telecommunication switches in response to the call setup message that a first one of a plurality of local telephone switching offices of the one of the first plurality of local exchange carriers to which the one of the plurality of telephone sets is connected requires echo cancellation operations; and means for enabling the Internet Protocol trunk circuit to provide an echo cancellation operation for a telephone call associated with the other call setup message.

46. The apparatus of claim 45 wherein the means for providing comprises means for adjusting the echo cancellation capabilities of the Internet Protocol trunk circuit with respect to an echo tail length for the first call path.

47. The apparatus of claim 46 wherein the means for providing the echo cancellation operation further comprises providing an additional echo cancellation operation in the one of the plurality of trunk circuits.

48. The apparatus of claim 47 wherein the means for providing comprises further adjusting the echo cancellation capabilities of the one of the plurality of trunk circuits.

* * * * *